Dec. 5, 1967  J. W. WALLACE  3,355,918
GAUGE CONTROL SYSTEM PROVIDING IMPROVED GAUGE ACCURACY
IN A REDUCTION ROLLING MILL
Filed Aug. 31, 1965  5 Sheets-Sheet 1

FIG. 1A.

WITNESSES:
Theodore F. Wrobel
James F. Young

INVENTOR
John W. Wallace
BY E. F. Possessky
ATTORNEY

United States Patent Office 3,355,918
Patented Dec. 5, 1967

3,355,918
GAUGE CONTROL SYSTEM PROVIDING IMPROVED GAUGE ACCURACY IN A REDUCTION ROLLING MILL
John W. Wallace, Amherst, N.Y., assignor to Westinghouse Electric Corporation, Pittsburgh, Pa., a corporation of Pennsylvania
Filed Aug. 31, 1965, Ser. No. 484,046
10 Claims. (Cl. 72—16)

The present invention relates to gauge control systems for reduction rolling mills and more particularly to automatic monitor gauge control systems for tandem hot strip steel rolling mills.

A rolling mill gauge control system usually includes a monitor gauge control system and its function is to monitor the delivery thickness of strip from a reference mill stand, usually the last stand, and to develop a signal representative of delivery gauge error for correctively controlling one or more of the stand gauge control subsystems. In hot strip steel mills, where the working strip thickness is relatively thick, each stand gauge control subsystem is usually provided in the form of a roll force gauge control or sometimes simply as a screw position controller, and gauge correction resulting from a stand or monitor error signal is thus ultimately produced by movement of the stand screws which correct the various stand roll openings.

Gauge correction at the stand locations may be produced to one extent or another by a strip tension control system with or without simultaneous and continuous screw position control. Tension control normally plays the primary gauge correction role in cold strip mills where the working strip thickness is relatively thin, whereas in hot strip mills it normally plays only an auxiliary role.

In any event, once the stand gauge control subsystems are selected for a particular mill, the monitor gauge control system is tailored to operate with one or more of the stand subsystems in providing steady-state strip delivery gauge control. In multistand mills, gauge correction is desirably produced by distributed action of the various gauge controlled stands so that no single stand is operated to the limits of its gauge control range.

In practice, the monitor gauge control system includes a strip thickness measuring device such as a radiation or X-ray gauge, and a sampling system periodically gates gauge error signals to a feedback operational amplifier or integrator usually at a rate which allows strip which is correctively acted upon in response to one error signal to be transported to the thickness gauge at or before the time of the next successive error signal. The monitor gauge control system thus is characterized with some measure of stability in adaptively controlling the strip delivery thickness.

The transport delay or off-sampling time results in delivery of off gauge material when the monitor gauge control system is set for undercorrection, that is, when it is undertuned at a low gain. Increasing the monitor gain or decreasing the off-sampling time improves the rate at which gauge correction is achieved, but excessive overcorrection almost always results and a new reverse gauge error must then be corrected. Such instability results in generally inaccurate although not necessarily unacceptable gauge along the strip length. Instead, it is desirable that the monitor gauge control system respond to delivery gauge errors rapidly and stably to produce gauge correction substantially at 100% tuning, as opposed to undertuning or overtuning, and that it simultaneously produce distributed corrective gauge control at the stand locations.

In accordance with the principles of the present invention, a gauge control system for a reduction rolling mill comprises at least two monitor gauge control subsystems, of which one is connected to the gauge control of at least one early mill stand and another is connected to the gauge control of at least one subsequent mill stand. The monitor subsystems are interrelated to each other and to the overall gauge control system so as to produce predetermined distributed gauge control action at the stand locations and so as to produce rapid and relatively stable gauge correction with overall improvement in gauge accuracy of the delivered strip.

It is, therefore, an object of the invention to provide a novel gauge control system for a reduction rolling mill which operates with improved monitor stability and produces overall improvement in strip gauge accuracy.

Another object of the invention is to provide a novel gauge control system for a reduction rolling mill which efficiently distributes monitor gauge control correction loading to the gauge controls at various mill stands while producing overall improvement in strip gauge accuracy.

An additional object of the invention is to provide a novel gauge control system for a reduction rolling mill which includes two or more interconnected monitor gauge control subsystems so as to produce coarse gauge correction through early stand gauge control and fine gauge correction through subsequent stand gauge control and thereby rapidly and stably produce gauge error correction with overall improvement in strip gauge accuracy.

These and other objects of the invention will become more apparent upon consideration of the following detailed description along with the attached drawings, in which:

Figure 1A:
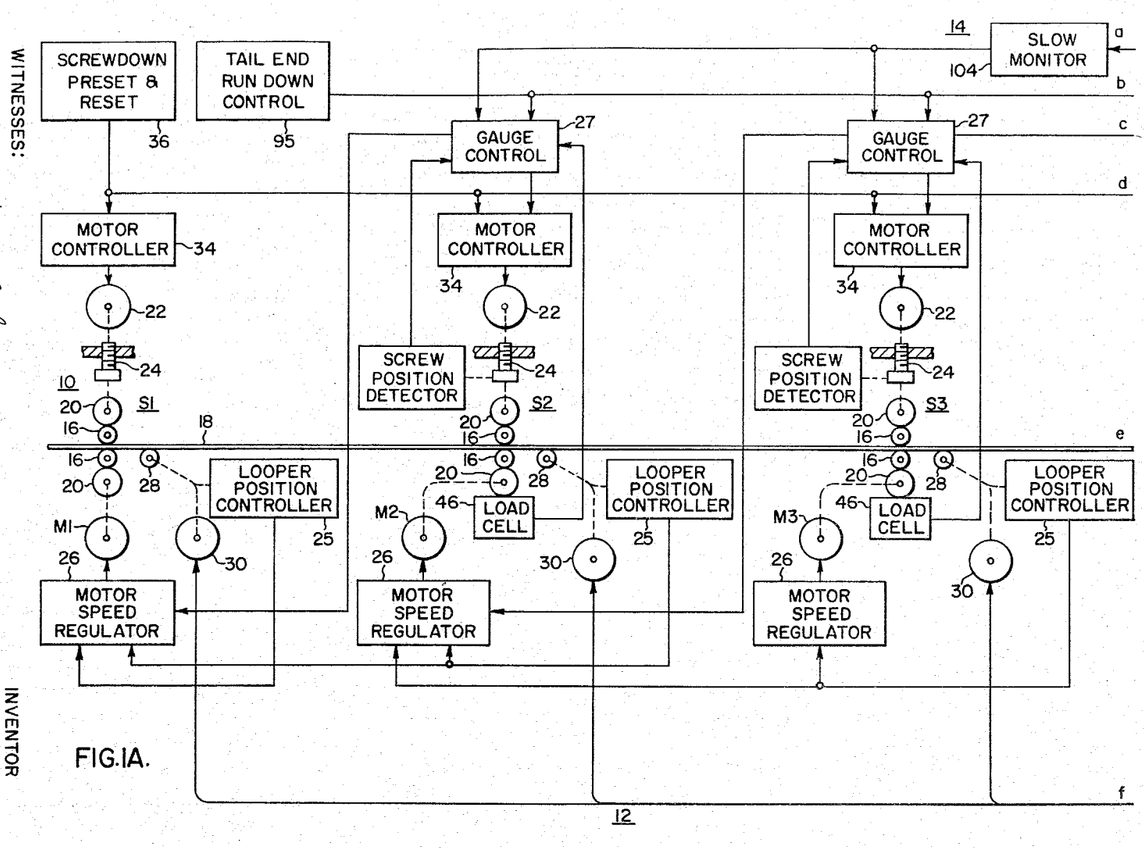
FIGS. 1A and 1B together schematically show a hot strip steel reduction rolling mill arranged and controlled in accordance with the principles of the invention.
Figure 1B:
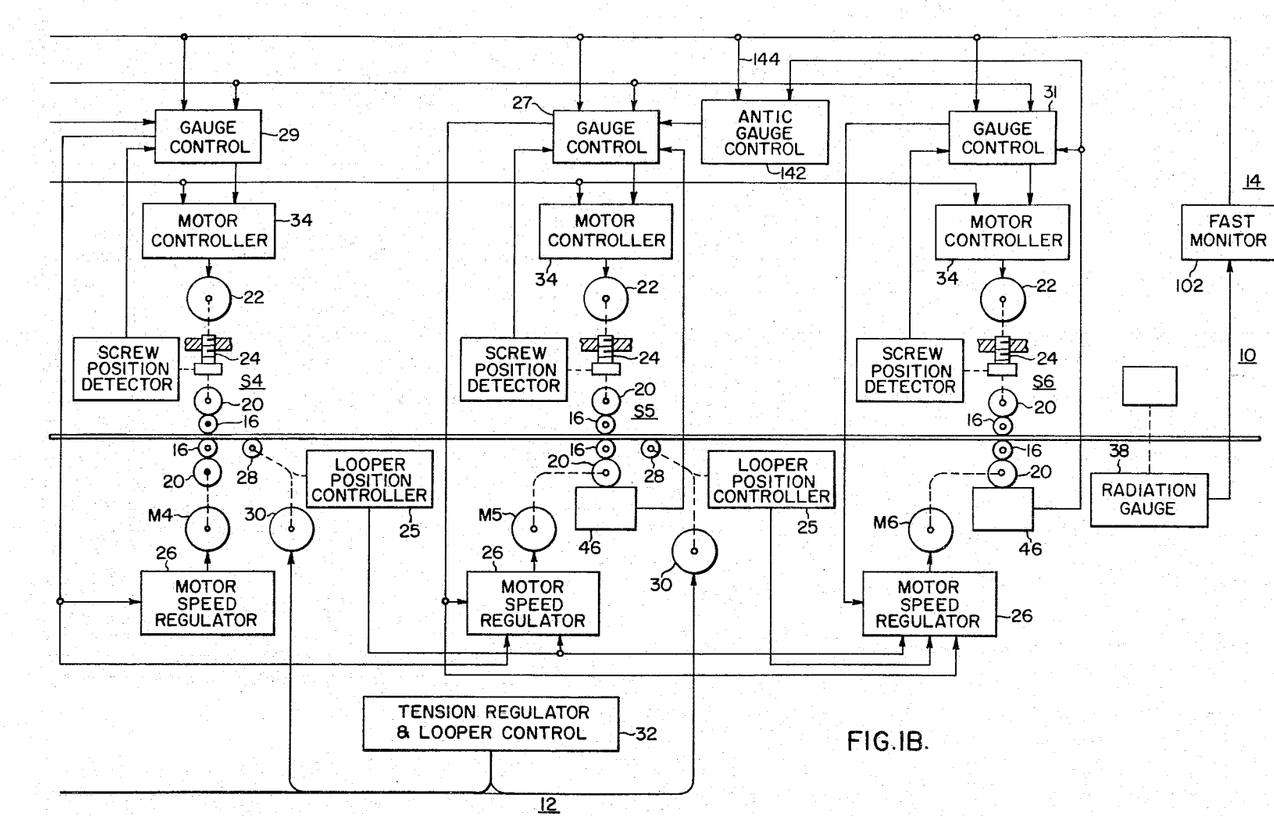

More specifically, there is schematically shown in FIGS. 1A and 1B a multistand reduction rolling mill 10 provided with a control system 12 including a monitor gauge control system 14 arranged in accordance with the principles of the invention. The mill 10 is a tandem hot strip finishing train steel mill, for which the invention is especially adapted. However, the invention can be embodied in other well known types of steel mills and it can be embodied in mills which roll materials other than steel. The mill 10 and the control system 12 are shown to indicate a suitable environment for the present invention, and they are shown in schematic form in order to simplify the drawings and clarify the invention disclosure particularly in view of the fact that many of the mill and control components and subsystems are well known per se in the art or can be formed for numerous well known functionally equivalent circuits or elements.

The mill 10 is provided with six roll stands S1 through S6, although a lesser or greater number of stands can be employed. Each stand is provided with opposed rolls 16 between which hot steel strip 18 is guided for gauge reduction. Backup rolls 20 on each stand provide the roll force needed to reduce the strip 18 in thickness as it passes between the rolls 16.

A pair of screwdown motors 22 (only one is shown) operate a pair of screws 24 (only one is shown) at each stand to control the force applied to opposite ends of the backup rolls 20 and thereby affect the size of the opening through which the strip 18 passes between the rolls 16. The strip 18 begins as a bar at the entry to the first stand S1 and is successively reduced as it passes through the stands S2–S5.

In most applications, the last stand S6 operates as a shaping stand, that is, it reduces strip gauge by an amount approximately required to prevent strip slippage although the last stand gauge control can be arranged and operated to provide fine strip gauge control. When the strip is delivered from the last stand S6 to a coiler (not shown), it is rolled in finished form with substantially uniform gauge throughout its length.

Motors M1–M6 are coupled to the backup rolls 20 at the respective stands S1–S6 to drive the mill 10. As the strip 18 moves from one stand to the next, its speed must be increased to make up for the increased length resulting from gauge reduction. A speed or voltage regulator 26 is thus generally provided for each drive motor, and if desired all of the regulators 26 can be coupled to a master regulator (not shown) so as to control the overall mill speed. The entire mill 10 can thereby be accelerated to a run speed of 4,000 f.p.m., for example, after the strip 18 has been threaded, on the previously described coiler, at a thread speed of 2,000 f.p.m. for example.

It is desirable that strip tension at the roll interface be held within a predetermined range since tension can be a significant determinant of gauge and width reduction and, in turn, the extent to which gauge error must be corrected by gauge control subsystem 27 or 29 or 31 at the various stands. As is well known in the art, a looper 28 is thus positioned between each pair of stands and its position is controlled by a looper motor 30 operated by a tension regulator and looper control system 32. The looper 28 can instead include a hydraulic motor (not shown) which is preset to lift the strip 18 at the interstand location to an extent determined by the downward pull on the strip 18 from the rolls 16. In either case, a looper position controller 25 transmits a control signal to the drive motor speed regulator 26 of previous or subsequent stands to vary the drive motor speed for looper position regulation.

At least some of the stand gauge control subsystems employ roll force gauge control, specifically the gauge control subsystems indicated by the reference character 27. The roll force gauge control operates on the principle that an elastic separating force is produced on the rolls as the strip is reduced through plastic deformation. Thus, a change in gauge is accompanied by a change in force on the rolls, and the roll opening is changed in accordance with the stretch or mill spring characteristics of the rolls and the stand structure. The screwdown pressure on the rolls must be changed to produce the roll force required to maintain a constant roll opening and corresponding gauge constancy. The roll force principle is summarized by the following most commonly used formula:

$$dh = MdF + dS$$

where:
$dh$ = change in thickness
$M$ = mill spring constant
$dF$ = change in roll force from a reference value
$dS$ = change in screw position from original setting Signals corresponding to $MdF$ and $dS$ are generated and summed, and with proper signal calibration and polarity, substantially constant gauge can be held by controlling the screw position so that the roll force and screw position quantities add to zero.

The stand gauge control subsystem employed at the stand S4, as indicated by the reference character 29, is preferably connected in slave relation to the roll force gauge control subsystem 27 provided at the stand S3. Better stand gauge control stability and accuracy are thereby achieved in a manner and for reasons more fully disclosed in the copending application Serial No. 455,111 entitled "Slave Gauge Control System for a Rolling Mill," filed by J. Wallace on May 12, 1965 and assigned to the present assignee. The last stand gauge control subsystem 31 is in this instance arranged to provide fine delivery gauge control in response to error information received from the gauge monitor system 14.

Gauge control is provided by the stand gauge control subsystems 27, 29 and 31 through screwdown position controls or screwdown motor controllers 34 located at stands S2–S6. A screwdown motor controller is also provided at stand S1 without roll force or other automatic control. The stand gauge control subsystems 27, 29 and 31 are also used in part to control drive motor speed so as to keep the looper position regulation within its operating range. A screwdown preset and reset system 36 provides for manual screwdown control and also controls the original roll set and reset positions at all of the stands S1–S6.

A radiation gauge 38 measures delivered strip thickness at a reference stand such as the last stand S6 to provide steady state gauge error correction relative to a fixed reference strip thickness through the gauge monitor system 14. The monitor system 14 is connected to the stand gauge control subsystems 27, 29 and 31 so as to provide distributed correction loading and improved gauge control stability and accuracy as will be more fully disclosed hereinafter.

In each roll force gauge control subsystem 27, a load cell 46 (FIG. 2) operates as a transducer to produce a roll force signal at terminals 48 and 50 in accordance with the mill spring constant M. The roll force signal is passed in a feedback path 52 through a filter 54 and a gain adjustment potentiometer 56 to a roll force error detector 58. Preferably, the error detector output signal resulting from the initial roll force signal produced by entering strip is reversed in polarity and held constant at the error detector input by means of an inverter 60 and an integrator 62. The roll force input and the initial reference input are thereafter continuously added algebraically during the strip pass to produce an error output corresponding to $MdF$ in the roll force equation. When the strip 18 is fully rolled, a logic switch 64 is opened to reset the reference error detector input to zero. The roll force reference value can also be set by other means such as a manual potentiometer or a signal from a computer rather than the head and lock-on means described.

Figure 2:
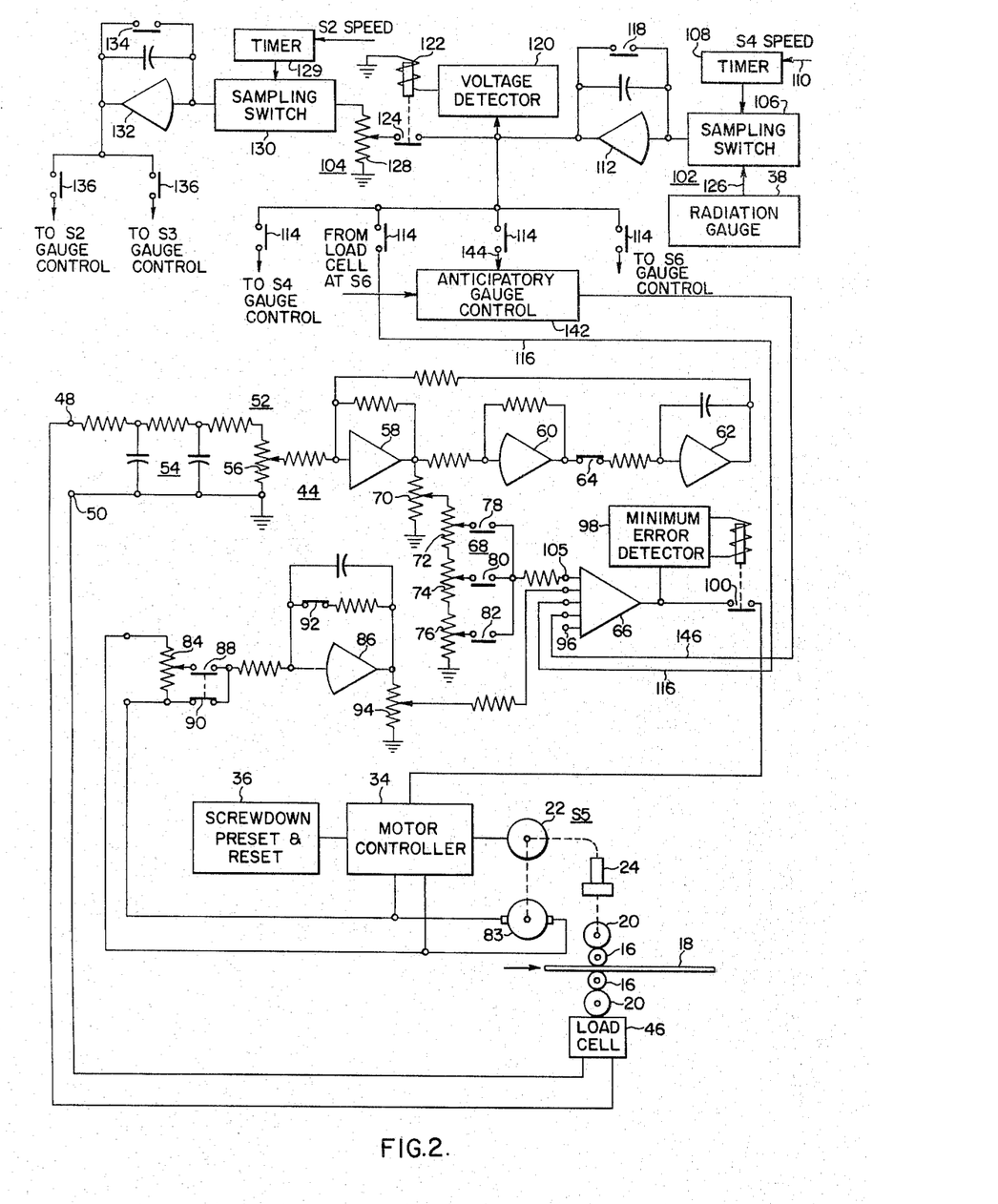
FIG. 2 schematically shows a portion of a monitor gauge control system which forms a part of the overall mill shown in FIG. 1 and which is shown here in greater detail in accordance with the principles of the invention.

The roll force error detector output is fed to a suitable commercially available summing amplifier 66 through a gain adjustment network 68 including a potentiometer 70 and high, medium and low gain potentiometers 72, 74 and 76. A logic or manual switch 78, 80 or 82 is connected between each potentiometer 72, 74 or 76 and the summing amplifier 68 so as to determine the gain range within which the roll force error is fed back for screw position control.

To produce the feedback screw position signal $dS$ for summation with the roll force error signal $MdF$ at the summing amplifier 66 in accordance with the roll force equation, a pilot generator 83 is coupled to the screwdown motor 22 and feeds a signal through a gain adjustment potentiometer 84 for integration over time by an integrator 86 as the screwdown motor is operated. Logic or manual switches 88, 90 and 92 provide for reset of the screw position integrator 86 after each strip pass.

The output from the integrator 86 is fed through another feedback gain adjustment potentiometer 94 to the input of the summing amplifier 66. To provide gauge error correction in response to error detection at the radiation gauge 38, the gauge monitor system 40 is connected to the summing amplifier 66 and summed against the screw position feedback signal. Additional signals can be transmitted to the summing amplifier 66 through one or more terminals 96 for special purposes. For example, a tail end system 95, an excess tension limit monitor system (not shown), and an acceleration monitor system (not shown) can all provide signals to the summing amplifier 66 so as to compensate for tail end and acceleration gauge deviation and so as to regulate any provided tension gauge control system within its range of effectiveness. Preferably, there is provided at the output of the summing amplifier 66 a minimum error detector 98 which controls a contact 100 so as to provide stand gauge error correction only above some minimum quantity of error, which defines a desired dead band of screwdown operation.

Output from the summing amplifier 66 represents a thickness error signal $dh$ and it is applied to the screwdown position control 34, for example, a field controlled generator or a gate controlled thyristor circuit, so as to reposition the screws 24 for stand gauge correction. At stands S2 and S5, the roll force gauge control subsystems 27 are preferably set so that the roll force error signal gain and the position signal gain cooperate to produce full or nearly full correction of detected or anticipated stand gauge error. The roll force gauge control subsystem 27 at stand S3 and the slave gauge control system 29 at stand S4 are preferably cooperatively tuned to produce full correction of the detected or anticipated gauge error at stand S3 under varied operating conditions without gauge control instability or screw runaway as more fully explained in the aforementioned copending application.

The stand gauge control subsystem 31 at stand S6 is similar to the roll force gauge control subsystem 27 in that it preferably includes a summing amplifier similar to the amplifier 66, but it does not include a load cell nor a roll force error signal generating network. The stand gauge control subsystem 31 is thus merely set to provide gauge control at stand S6 in response to error information generated by the gauge monitor system 14. Since the stand S6 is the finishing stand of the mill 10, the gauge control subsystem 31 is preferably tuned to provide very fine delivery gauge control.

The stand gauge control subsystems 27, 29 and 31 provide gauge control at the stand locations in response to transient gauge errors detected at the stand locations. The gauge control subsystems 27 and 29 and 31 provide steady state gauge correction to a fixed reference gauge in response to the functioning of the gauge monitor system 14.

In accordance with the principles of the present invention, the monitor system 14 is correlated with the stand gauge control subsystems in the control system 12 in a manner which results in improved gauge accuracy and improved gauge control stability. Basically, the monitor system 14 is arranged to include two or more monitor subsystems interconnected with each other and associated respectively with the gauge control subsystems of one or more stands. In the embodiment of FIG. 1, the monitor system 14 includes a fine fast late stand monitor subsystem 102 and a course slow early stand monitor subsystem 104 associated respectively with stands S4–S6 and with stands S2–S3.

The monitor subsystems 102 and 104 selectively transmit monitor gauge error signals to the various associated gauge or shaping control stands so as rapidly and relatively stably to produce full gauge error correction while providing appropriate distributed gauge correction loading at the various stands. To these ends, small strip gauge delivery errors are preferably corrected at the late stands and larger strip gauge delivery errors or accumulated small gauge errors are preferably corrected at the early stands or both the early and the late stands.

The preselected channeling of gauge error signals to the various stands results in overall reduction of the average transport delay time required for the results of actual error correcting stand action to be sampled and thereby permits the monitor system gain settings to be tuned for substantially 100% gauge error correction with relatively little or no resultant gauge overcorrection. To effect more rapid gauge correction, particularly for excessively large errors or to provide anticipatory gauge correction for expected temperature rundown effects or the like, it may be desirable to increase the sampling rate for either or both of the monitor subsystems 102 and 104 beyond that corresponding to the actual transport delay time associated with the monitor subsystem 102 or 104. However, objectionable gauge overcorrection can result if the sampling rate increase is excessive. Furthermore, although the effective gain may then be satisfactory for large errors, it may be excessive for small and average or normal errors.

In FIG. 2, the monitor system 14 is shown in greater detail in conjunction with the roll force gauge control subsystem 27 located at stand S5. A strip gauge error signal is produced for the fast monitor subsystem 102 by means of the radiation or X-ray gauge 38 which may be any suitable commercially available device. The error signal itself or a minimum detected error signal is applied to a sampling switch 106 which also may be any suitable commercially available device, for example one in which circuit gating is produced periodically by means of a time controlled bistable multivibrator. The switching rate of the sampling switch 106 in turn is controlled by a timer 108 which is set to produce a predetermined on time and a predetermined off time for the sampling switch 106. The off sampling time can correspond to the actual strip transport delay time to the radiation gauge 38 from a predetermined stand, in this instance stand S4.

Both the on sampling time and the off sampling time can be continuously readjusted by means of a feedback signal representative of the speed of the predetermined stand S4 as indicated by the reference character 110. The timer 108 can be a suitable commercially available device, such as a transistor timing module or a timing relay.

The output sampling signal from the sampling switch 106 is applied to the input of an operational amplifier or integrator 112 which can also be provided in the form of a suitable commercially available device, such as a transistor amplifier module. In turn, the output signal from the integrator 112 holds at the integrated value and is applied through logic switches 114 to the stand gauge control subsystems 29 and 31 at stands S4 and S6 and to the stand gauge control subsystem 27 at stand S5 as indicated by the reference character 116. When the monitor error signal is applied to the gauge control subsystems at the stands S4–S6, gauge correction at the stands S4–S6 is produced in the manner previously described. A logic switch 118 provides for resetting the fast monitor integrator 112 after each strip pass through the mill 10. As previously indicated, the error sampling rate preferably corresponds to the strip transport delay time from the stand S4, and the rate at which delivery gauge errors are monitored and corrected is thus relatively fast. The sampling off time can be decreased, for example to correspond to the transport delay time from the stand S5, but as previously described excessive increase in the sampling rate can lead to substantial gauge overcorrection.

Gauge error signals in excess of a predetermined level result in gauge correction functioning by the slow monitor subsystem 104. Thus, a voltage detector 120 is connected to the output of the fast monitor integrator 112, and it actuates a relay 122 or other switching means to close a contact 124 which connects the fast monitor integrator output with the input of the slow monitor gauge control subsystem 104 when a predetermined fast monitor integrator output voltage level is reached. The voltage detector 120 can be provided in any suitable form, for example, it can be a bistable solid state multivibrator circuit. The fast and slow monitor interconnection scheme shown in FIG. 2 is the preferred arrangement, but alternate interconnecting relationships can be employed, for example, the fast and slow gauge monitor subsystems 102 and 104 can be parallel connected (not shown) to the radiation gauge with the voltage detector 120 and the switch contact 124 making connection with an output connector 126 of the radiation gauge 38.

A gain adjusting potentiometer 128 is connected between the output of the fast monitor integrator 112 and a sampling switch 130 at the input of the slow monitor gauge control subsystem 102. The switch 130 is gated by a timer 128 preferably with the sampling off time corresponding to the strip transport time from stand S2 to the radiation gauge 38. Signal output from the switch 130 is applied to the input of a slow monitor integrator 132 for which a reset logic contact 134 is provided. The integrated error signal output from the slow monitor integrator 132 holds as accumulated and is applied through logic switches 136 to a summing amplifier (not shown) or the like in the roll force gauge control subsystems 27 at stands S2 and S3.

Gauge correction at stands S2 and S3 thus is initiated when the fast monitor output voltage reaches the preset level detected by the voltage detector 120. For example, the voltage detector 120 can be set to initiate operation of the slow monitor subsystem 104 when the output voltage signal from the fast monitor subsystem 102 reaches a level corresponding to about 3% error in the delivery strip thickness. Gauge errors less than 3% then are corrected through opertion of the gauge control subsystems at stands S4–S6 in response to the fast monitor subsystem 102, and large gauge errors are corrected by operation of the gauge control subsystems at stands S2–S6 in response to operation of the fast and slow monitor subsystems 102 and 104. Accordingly, the slow monitor subsystem 104 produces gauge correction when a single large gauge error appears or when a number of small gauge errors are accumulated over a period of time.

Other operating relationships between the fast and slow monitor subsystems 102 and 104 can be provided if desired. For example, particularly if the slow monitor system 104 is directly connected to the radiation gauge 38 as previously described, the fast monitor subsystem 102 can be made operative for small gauge errors and inoperative for large gauge errors. However, it is preferable that the fast monitor subsystem 102 be operable for both large and small gauge errors. Further, on very large gauge errors, both monitor subsystems 102 and 104 can sample at the same fast rate to produce on gauge material faster. Suitable logic control (not shown) can initiate this mode of operation.

In order to maintain the fast monitor subsystem 102 within its gauge correction range, it is reset as operating conditions warrant. In this manner, small gauge errors following a large gauge error can be handled by the fast monitor subsystem 102 rather than being channeled to the slow monitor subsystem 104 as a result of accumulated error output voltage from the fast monitor subsystem 102.

In the preferred arrangement of FIG. 2, fast monitor reset action is automatically produced by suitable adjustment of the slow monitor gain adjustment potentiometer 128. The slow monitor subsystem gain is adjusted to produce gauge correction slightly greater than that actually required to correct the actual gauge error indicated by the radiation gauge 38. The very slight gauge overcorrection produced by the slow monitor subsystem 104 results in a reverse error signal input to the fast monitor subsystem 102 and fast monitor reset action is thus automatically produced.

Figure 3:
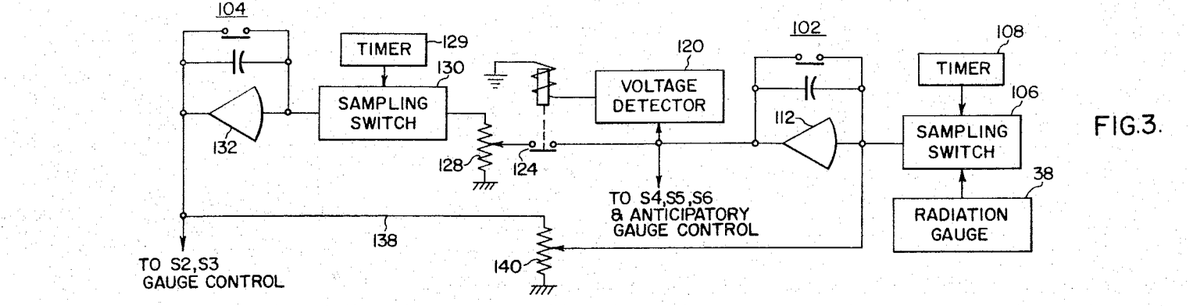
FIG. 3 schematically shows a portion of an alternate embodiment of the monitor gauge control system in accordance with the principles of the invention.

As a fast monitor reset alternate, there is shown in FIG. 3 a feedback path 138 from the slow monitor subsystem 104 to the fast monitor subsystem 102. A gain adjustment potentiometer 140 fixes the amount of output voltage from the slow monitor subsystem integrator 132 which is directly transmitted to the input of the fast monitor integrator 112. By proper adjustment of the potentiometer 140, the fast monitor integrator 112 can be reset substantially without slow monitor gauge overcorrection.

As an aid to the operation of the gauge monitor system 14, an anticipatory gauge control (FIG. 2) 142 is connected between the gauge control subsystems at stand S6 and stand S5. The signal output from the load cell 46 at stand S6 is applied to the anticipatory gauge control 142 where it is algebraically summed with the fast monitor output as indicated by the reference character 144 and if desired other suitable gauge control signals. A summing amplifier similar to the amplifier 66 can be used for the addition operation in the anticipatory gauge control 142 if desired. The signal output from the anticipatory gauge control 142 is applied to the summing amplifier 66 in the gauge control subsystem 27 at the stand S5 as indicated by the reference character 146. Gauge errors existing at stand S6 and sensed by the load cell 46 at stand S6 through a change in roll force immediately initiate gauge error connection in stand S5 through the gauge control system 27 associated therewith and gauge correction is thus initiated in advance of gauge error detection and correction by the monitor system 14.

Figure 5:
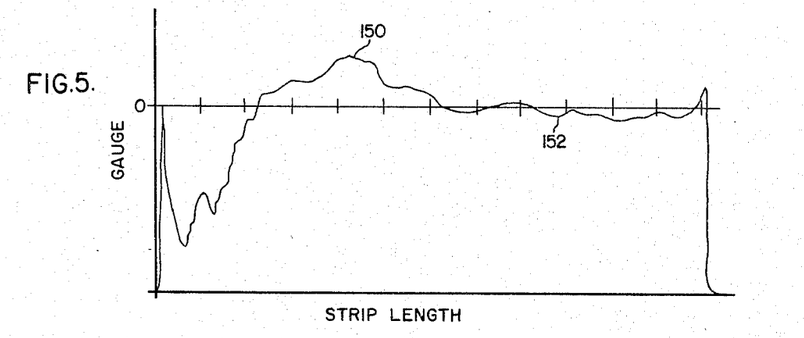
FIG. 5 shows a gauge chart indicative of the results achieved with prior art gauge monitor control.

In FIG. 5, there is shown a gauge chart representing the operation of a conventional monitor system. The zero reference represents desired gauge. In this instance, a large gauge error requiring monitor system operation was produced by inserting a new strip into the rolling mill with a new entry gauge and width. The monitor system produced a relatively large initial over-correction as indicated by the reference character 148 and a relatively large reverse overshoot as indicated by the reference character 150 then followed. The monitor system then generally stabilized the delivery gauge of the strip after about one-half of the strip pass as indicated by the reference character 152. The conventional monitor system was tuned for approximately 100% gauge correction yet it resulted in considerable gauge inaccuracy and gauge control instability before the relatively stable rolling condition 152 was achieved.

Figure 6:
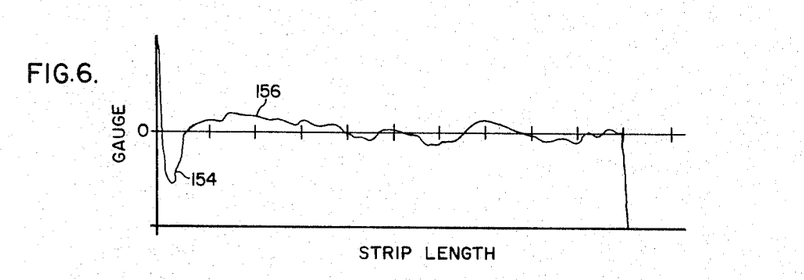
FIG. 6 shows a gauge sketch indicative of results achieved with use of the present invention.

In FIG. 6, there is shown a gauge sketch representative of the operation of a monitor system in accordance with the principles of the present invention. The sketch shows results corresponding to the use of a monitor system equivalent to the fast and slow monitor subsystems 102 and 104 described in connection with FIG. 2. Strip entry conditions correspond to those described in connection with FIG. 5. As indicated by the reference character 154, initial overcorrection is relatively slight and as indicated by the reference character 156 relative gauge control stability immediately ensues. Improved gauge accuracy and better gauge control stability is thus achieved with the use of the present invention. In general, such results are achieved simultaneously with appropriate distribution of correction loading among the various stands in a multi-stand mill. The improved results stem from the fact that quicker detection is made of gauge error corrections so that 100% monitor tuning can be employed without incurring excessive overcorrection.

Figure 4:
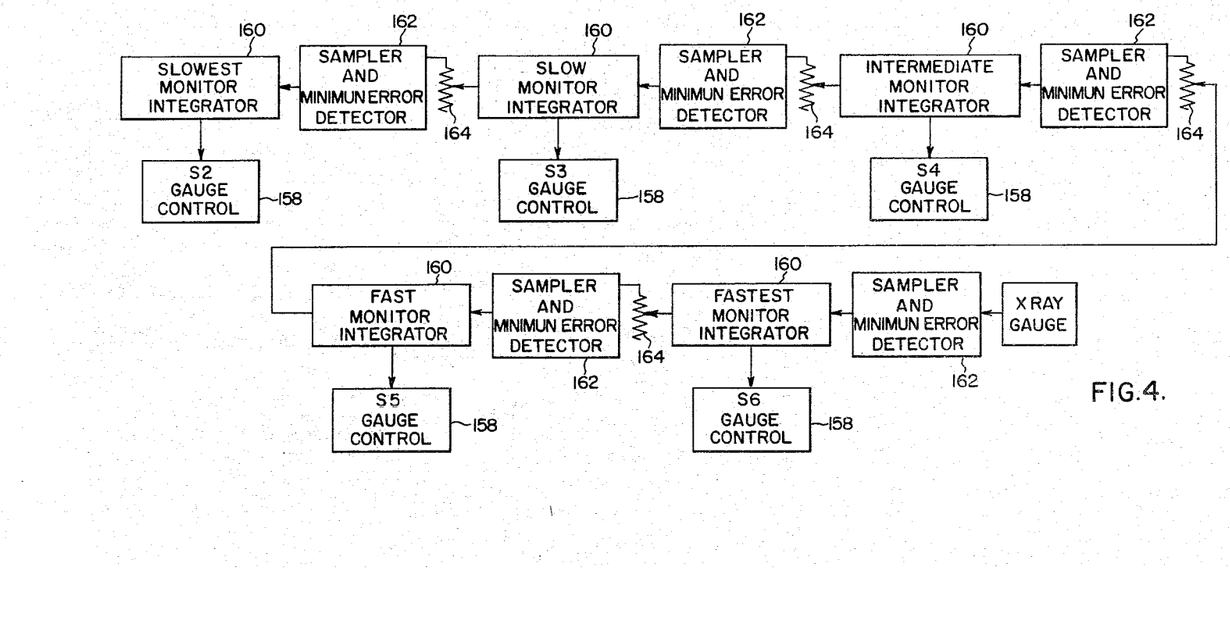
FIG. 4 schematically shows another embodiment of the monitor gauge control system in accordance with the principles of the invention.

The invention can be provided in other forms and can be used with mills and mill control systems other than those described herein. For example, the control system 12 can include a monitor system 158 as shown in FIG. 4. In this scheme, a monitor subsystem 160 is provided for each stand S2 through S6. The subsystems 160 are given nomenclature according to the speed of gauge correction response as determined by the various stand locations. The monitor subsystems 160 are preferably interconnected through respective voltage or minimum error detectors and sampling switches as indicated by the reference character 162 in a manner similar to that described in connection with FIG. 2. Further, gain adjustment potentiometers 164 are also provided between successive monitor subsystems 160 as described in connection with FIG. 2. Finer division of gauge error correction is made among the stand gauge control subsystems with the use of the monitor system 158. The particular number of monitor subsystems used in relation to the number of stands under subsystem gauge control depends upon the kind of gauge control desired for any particular mill installation. Reset action can be achieved in a manner similar to that described for FIG. 2.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A gauge control system for a reduction rolling mill having at least two roll stands and respective gauge control subsystems associated with each of two respective stands, said gauge control system comprising a monitor system having first and second monitor subsystems responsive to delivery gauge error signals generated by a thickness error detector, said first monitor subsystem connected to one of the gauge control subsystems to produce gauge error correction at one of the two stands, said second monitor subsystem connected to the other gauge control subsystem to produce gauge error correction at the other stand, and means for controlling the gauge error level at which said second monitor subsystem becomes operative in relation to the gauge error level at which said first monitor subsystem becomes operative.

2. A gauge control system for a reduction rolling mill having at least two roll stands and respective gauge control subsystems associated with each of two respective stands, said gauge control system comprising a monitor system having first and second monitor subsystems responsive to delivery gauge error signals generated by a thickness error detector, said first monitor subsystem connected to one of the gauge control subsystems to produce large gauge error correction at an early one of the two stands, said second monitor subsystem connected to the other gauge control subsystem to produce small gauge error correction at the other stand, means for controlling the gauge error level at which said first monitor subsystem becomes operative, and means for resetting said second monitor subsystem to retain it within its small gauge correcting range.

3. A gauge control system for a reduction rolling mill having at least two roll stands and respective gauge control subsystems associated with each of two respective stands, said gauge control system comprising a monitor system having first and second monitor subsystems responsive to delivery gauge error signals generated by a thickness error detector, said first monitor subsystem connected to one of the gauge control subsystems to produce large gauge error correction at an early one of the two stands, said second monitor subsystem connected to the other gauge control subsystem to produce small gauge error correction at the other stand, means for controlling the gauge error level at which said first monitor subsystem becomes operative, and gain control means associated with said first monitor subsystem and being adjustable to produce slight gauge overcorrection by said first monitor subsystem so as to retain said second monitor subsystem within its small gauge correcting range.

4. A gauge control system for a reduction rolling mill having at least two roll stands and respective gauge control subsystems associated with each of two respective stands, said gauge control system comprising a monitor system having first and second monitor subsystems responsive to delivery gauge error signals generated by a thickness error detector, said first monitor subsystem including a first integrator having its output connected to one of the gauge control subsystems to produce large gauge error correction at an early one of the two stands, said second monitor subsystem including a second integrator having its output connected to the other gauge control subsystem to produce small gauge error correction at the other stand, means for controlling the gauge error level at which said first monitor subsystem becomes operative, means connecting the output of said first integrator with the input of said second integrator so as adjustably to reset said second monitor subsystem and retain it within its small gauge correcting range.

5. A gauge control system for a reduction rolling mill having a plurality of roll stands with respective stand gauge control subsystems, said gauge control system comprising a monitor system having a first monitor subsystem and a second monitor subsystem responsive to delivery gauge error signals generated by a thickness error detector, said second monitor subsystem connected to the gauge control subsystems of a first group of said stands to produce large gauge error correction at the stands included in said first group, said first monitor subsystem connected to the gauge control subsystems of a second group of said stands to produce small gauge error correction at the stands in said second group, and means for controlling the gauge error level at which said second monitor subsystem becomes operative in relation to the gauge error level at which said first monitor subsystem becomes operative.

6. A gauge control system for a reduction rolling mill having a plurality of roll stands with respective stand gauge control subsystems, said gauge control system comprising a monitor system having a plurality of monitor subsystems responsive to delivery gauge error signals generated by a thickness error detector, each of said monitor subsystems connected to the gauge control subsystem of at least one of the stands, all of said monitor subsystems connected to different gauge control subsystems, and means for controlling the gauge error level at which said monitor subsystems become operative in relation to each other.

7. A gauge control system as set forth in claim 6 wherein each monitor subsystem is associated with one gauge control subsystem at one stand, and successive monitor subsystems associated with successive stands from delivery to entry ends of the mill become operative successively with increasing gauge error correction signal.

8. A gauge control system for a reduction rolling mill having at least two roll stands and respective gauge control subsystems associated with each of two respective stands, said gauge control system comprising a monitor system having a first monitor subsystem responsive to delivery gauge error signals generated by a thickness error detector, said first monitor subsystem connected to one of the gauge control subsystems to produce gauge error correction at one of the two stands, said monitor system having a second monitor subsystem connected to the output of said first monitor subsystem and having its output connected to the other gauge control subsystem to produce gauge error correction at the other stand, and means for controlling the gauge error level at which said second monitor subsystem becomes operative in relation to the gauge error level at which said first monitor subsystem becomes operative.

9. A gauge control system for a reduction rolling mill having at least two roll stands and respective gauge control subsystems associated with each of two respective stands, said gauge control system comprising a monitor system having a first monitor subsystem responsive to delivery gauge error signals generated by a thickness error detector, said first monitor subsystem connected to one of the gauge control subsystems to produce small gauge error correction at a late one of the two stands, said monitor system having a second monitor subsystem responsive to the output of said first monitor subsystem and having its output connected to the other gauge control subsystem to produce large gauge error correction at the other stand, means for controlling the gauge error level at which said second monitor subsystem becomes operative, and means for resetting said first monitor subsystem to retain it within its small gauge correcting range.

10. A gauge control system for a reduction rolling mill having a plurality of roll stands with respective stand gauge control subsystems, said gauge control system comprising a monitor system having a plurality of monitor subsystems responsive to delivery gauge error signals generated by a thickness error detector, said monitor subsystems respectively connected in series relation, each of said monitor subsystems connected to the gauge control subsystem of at least one of the stands, all of said monitor subsystems connected to different gauge control subsystems, and means for controlling the gauge error level at which said monitor subsystems become operative in relation to each other.

References Cited

UNITED STATES PATENTS

| | | | |
|---|---|---|---|
| 3,169,421 | 2/1965 | Bloodworth | 72—12 |
| 3,186,200 | 6/1965 | Maxwell | 72—8 |
| 3,232,084 | 2/1966 | Sims | 72—16 |

RICHARD J. HERBST, *Primary Examiner.*

A. RUDERMAN, *Assistant Examiner.*